Patented Nov. 11, 1952

2,617,788

UNITED STATES PATENT OFFICE 2,617,788

FLEXIBLE COATING COMPOSITION FROM A COPOLYMER OF AN ACRYLONITRILE, ALPHA METHYL STYRENE AND ETHYL ACRYLATE

Gerson S. Schaffel, Cuyahoga Falls, and Asher S. Wollison, Akron, Ohio, assignors to The General Tire and Rubber Company, Akron, Ohio, a corporation of Ohio No Drawing. Application August 19, 1949,
Serial No. 111,345

6 Claims. (Cl. 260—80.5)

This invention relates to coating compositions and particularly to coating compositions of the types which adhere to rubber and resilient articles and provide them with a tack-free glossy surface.

Rubber articles, such as window sealing strips and the like are now widely used in various motor vehicles as well as in other assemblies in positions where they are exposed to light, ozone and the like. A large number of the rubber compounds, particularly certain desirable synthetic rubber compounds, are subjected to age-hardening, stiffening or to cracking, even upon relatively short concentrated exposures to bright sunlight. It is therefore desirable to provide a coating composition which will adhere to the surface of the rubber and protect it from such sunlight and ozone. It is also desirable to color various rubber articles on motor vehicles as well as articles such as toys, bath mats and the like to improve the appearance and to match various colors and equipment with which such rubber articles are associated. Paints suitable for application to rubber articles must have a very substantial amount of flexibility and elongation, yet they must dry to a tack-free surface, have firm adhesion to rubber, offer protection for the article, and themselves be capable of withstanding the conditions encountered in service.

Various coating materials have heretofore been proposed for application to rubbery materials, but they have been almost universally found to be wanting in many of the above essentials. Either they did not dry to a tack-free surface, they did not adhere, or they tended to flake off or decompose under the conditions encountered in use in the rubber article.

It is an object of the present invention to provide a coating composition which may be applied to rubber and other rubberlike articles, as well as to rigid articles, which permits the rubber articles to be bent or stretched and yet which adheres firmly and protects the rubber articles and improves their appearance.

Certain of the flexible paints and coating compositions heretofore proposed for application to rubber have a tendency to harden or to polymerize further in use. Such is particularly the case with polychloroprene base compositions or mixtures of substantial parts of polychloroprene with other resinous materials. Such compositions, while initially flexible, soon lose a great portion of their elasticity, with the result that they quickly become unsatisfactory. It is therefore another object of the present invention to provide a flexible paint suitable for application to rubber articles, which paint is flexible, adherent, dries to a tack-free film, is not rapidly deteriorated by sunlight, ozone, or the elements, and yet maintains its flexibility over substantial periods.

It is another object of the present invention to provide a rubber article having a flexible coating thereon, which coating has the aforementioned flexibility and resistance to deterioration.

Other objects will be apparent from the following description of the invention.

We have found that the above and other objects are accomplished with coating compositions having as the basic film-forming ingredient thereof a copolymer of at least one unsaturated aliphatic nitrile selected from acrylic and methacrylic nitriles and mixtures of these nitriles containing the group

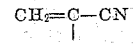

and having less than five carbon atoms, alpha-methylstyrene and an elongation-imparting monomer selected from the group consisting of ethyl acrylate and mixtures of ethyl acrylate, with at least one ester of methacrylic acid and a saturated aliphatic monohydric alcohol having four to nine carbon atoms, in which mixture the amount of said ethyl acrylate constitutes at least two-thirds of the weight of said mixture. We have obtained the desirable properties, however, only when the components of the copolymer are present in certain proportions as hereinafter described.

The copolymer is dissolved in a suitable solvent, with or without pigments or coloring materials, and is applied to the article to be coated. Any of the various solvents suitable for dissolving vinyl compounds may ordinarily be used in forming the solutions of the resinous materials. Usually, a mixture of solvents is used in order to provide the volatility desired for the final product. When the composition is to be used as a spray coating composition, the solvent mixture ordinarily should be less volatile than when the composition is to be used as a dipping or brushing composition for, as is well-known in the art, solvent mixtures of too much volatility cause an undue amount of cobwebbing at the nozzle of the spray gun.

Examples of suitable solvents are aromatic hydrocarbons, such as benzene, xylene and toluene, esters such as ethyl acetate, butyl acetate, amyl acetate and other liquid esters, lower boiling ketones such as methylethylketone, methylisopropenylketone, acetone, liquid nitroparaffins and the like. Up to 50% of one or more paraffinic liquid hydrocarbons may be present as diluents. Mixtures of any of the above solvents may be used.

The ethyl acrylate is an essential ingredient of the elongation-producing component in the coating composition of the present invention. It provides the flexibility, stretchability and elongation or resilience necessary to permit dried films of the coating composition to follow distortions in the rubber article without rupture of the film.

The elongation component should be present in amounts between about 65% and about 85% of the weight of the copolymer. As aforementioned, about one-third of the ethyl acrylate may be substituted by hexylmethacrylate or by a methacrylic ester of an alcohol having four to nine carbon atoms, of which esters of hexyl alcohol are much preferred and give superior results over the others.

The alpha-methylstyrene functions to increase the hardness of the film and to decrease or prevent tackiness; it is surprisingly far superior in this respect to styrene. The alpha-methylstyrene component of the copolymer should be maintained within the range of 5 to 15% of the weight of the copolymer. When the amount of alpha-methylstyrene component is greater than about 15%, the film formed from the coating composition becomes too hard and brittle, and when the amount is less than about 5 parts, the film becomes too tacky for ordinary use. Preferably, there is about 9 to 12% by weight of the alpha-methylstyrene present in the composition.

The acrylonitrile component is surprisingly required in the above copolymer to give adhesion to the film formed on rubber articles. It also improves the resistance of the film to deterioration. When the amount of acrylonitrile is less than 5% of the composition, great difficulty with adhesion is experienced. When the amount of acrylonitrile is greater than about 20 parts, the properties of the film as well as solubility of the resinous copolymer becomes adversely affected. Preferably, the acrylonitrile is present in amounts of 10 to 15% of the weight of the copolymer.

Although ethyl acrylate is for most applications suitable as the sole element for improving flexibility and resilience of the film formed of the compositions of the present invention, this component is relatively easily hydrolyzed. Therefore, in applications where it is desirable to improve resistance of the coating composition to hydrolysis and to water, a rubbery polymer-forming methacrylate, such as hexylmethacrylate, etc. is desirable as a substitute for part of the ethyl acrylate. Even small amounts of the higher methacrylic esters, such as hexylmethacrylate, materially improve the resistance of films formed by the composition. Thus, even as little as 1% of hexylmethacrylate in the copolymer noticeably improves the resistance of the copolymer to hydrolysis. However, when more than 30 parts of the hexylmethacrylate is present in the composition, other desirable characteristics are adversely affected.

The following examples, in which parts are by weight, illustrate the present invention:

*Example 1*

A copolymer is prepared by copolymerizing an aqueous emulsion of a mixture having the following composition:

| | Parts |
|---|---|
| Acrylonitrile | 12 |
| Alpha-methylstyrene | 10 |
| Ethyl acrylate | 75 |
| Water | 180 |
| Soap | 5 |
| Potassium persulfate | .3 |

The above ingredients are incorporated into an autoclave maintained at about 50° F. and equipped with means for stirring. They are agitated until polymerization is substantially 100% complete. The resinous copolymer is coagulated with salt and acid in accordance with usual procedures, washed and dried.

50 parts of the above copolymer were dissolved in 300 parts of toluene. The solution thus prepared was brushed on various rubber articles, including bath mats, window strips and the like. Upon drying of the film, the articles had an exceptionally high resistance to ozone and the coated article could be stretched, bent, distorted and otherwise treated without destroying the adhesion or cracking of the film. The coated article had an exceptionally high degree of gloss; it was tack-free.

Light colored rubber mats, partially coated with the above composition, were placed on the factory floor, where they were subjected to much traffic and to considerable carbon black. When the mats were washed, the part of the mats that was coated came out free from defects, whereas the part of the mat that was uncoated was stained and discolored so that it was undesirable for further use.

*Example 2*

A polymer was prepared in identical manner to that of Example 1 except that the ethyl acrylate content of the monomers was but 50 parts, and 25 parts of hexylmethacrylate were added to the mixture prior to polymerization. The copolymer was dissolved in the same manner as set forth in Example 1 and applied to rubber articles which were placed in a weatherometer where the coating was subjected to conditions favorable to hydrolysis, as well as to ozone. The weatherometer test shows that the coating had exceptional durability with regard to ozone and to other deteriorating influences. The resistance to hydrolysis was much improved over that of the composition of Example 1, while the exceptional durability with respect to ozone, sunlight and other deteriorating influences, as well as gloss, tack and elongation, was still maintained.

In the above examples, a portion of the ethyl acrylate and/or hexylmethacrylate may be substituted by butyl methacrylate or other higher methacrylates to modify the composition, hexylmethacrylate being preferred, as above stated.

The coating compositions of the above examples may also be pigmented with various pigments, such as titanium dioxide, carbon black, lithopone, and may also contain dyes and other organic coloring materials.

The solvent in the above examples may be substituted by other suitable solvents, such as those previously mentioned.

Although the invention may be employed in various ways, only preferred embodiments have been illustrated and described. Other embodiments may be made within the invention as provided by the patent statutes.

What we claim is:

1. A coating composition comprising a solution in volatile solvent of a copolymer consisting essentially of 60 to 85% of an acrylate selected from the group consisting of ethyl acrylate and mixtures of ethyl acrylate with a methacrylic ester of an alcohol which consists of a saturated hydrocarbon group and one hydroxy group and which has four to nine carbon atoms, in which mixtures the ratio of the weight of the ethyl acrylate to the high methacrylic acid ester is at least two to one, 5 to 15% by weight of alpha-methylstyrene, and an acrylonitrile component consisting of at least one acrylonitrile having less than five carbon atoms, said acrylonitrile component consisting of a hydrocarbon group and a nitrile group being present in amounts of 5 to 20% by weight of the copolymer.

2. A copolymer of at least one acrylonitrile having less than five carbon atoms, ethyl acrylate and alpha-methylstyrene, said acrylonitrile being present in amounts of 5 to 20% by weight, said alpha-methylstyrene being present in amounts of 5 to 15% by weight, and said ethyl acrylate being present in amounts of 65 to 85% by weight.

3. A copolymer which may be dissolved in solvents to prepare coating compositions of sufficient flexibility to be applied to rubber products, comprising about 5% to about 20% by weight of at least one acrylonitrile of less than five carbon atoms and consisting of a hydrocarbon group and a nitrile group, about 5% to about 15% by weight of alpha-methylstyrene, an elongation-imparting monomer selected from the group consisting of ethyl acrylate, and mixtures of ethyl acrylate with a methacrylic ester of a saturated alcohol having four to nine carbon atoms, in which mixtures the weight ratio of ethyl acrylate to said methacrylic ester is at least two to one, and said elongation-imparting monomer being present in total amounts of 65 to 85% by weight of the copolymer, said alcohol consisting of one saturated hydrocarbon group and one hydroxyl group.

4. A copolymer which may be dissolved in solvents to prepare coating compositions of sufficient flexibility to be applied to rubber products, comprising about 5% to about 20% by weight of at least one acrylonitrile of less than five carbon atoms, about 5% to about 15% by weight of alpha-methylstyrene, and about 65% to about 85% of a mixture of ethyl acrylate and hexylmethacrylate in which the ratio of ethyl acrylate to hexylmethacrylate is at least two to one, said copolymer being soluble in volatile aromatic solvents.

5. A coating composition comprising a solution in volatile solvent of the copolymer according to claim 4.

6. A rubber article having surface portions thereof coated with a solution of a copolymer according to claim 3.

GERSON S. SCHAFFEL.
ASHER S. WOLLISON.

REFERENCES CITED

The following references are of record in the file of this patent:

UNITED STATES PATENTS

| Number | Name | Date |
|---|---|---|
| 2,446,049 | Kropa | July 27, 1948 |